United States Patent [19]

Sanders, Jr. et al.

[11] Patent Number: 4,921,365

[45] Date of Patent: May 1, 1990

[54] HIGH SPEED SHUTTLE PRINTER

[75] Inventors: Royden C. Sanders, Jr., P.O. Box 550, Hillsborough Mills/Elm St., Wilton, N.H. 03086; John L. Forsyth, Greenfield; John P. Conant, Milford, both of N.H.

[73] Assignee: Royden C. Sanders, Jr., Wilton, N.H.

[21] Appl. No.: 230,458

[22] Filed: Aug. 10, 1988

[51] Int. Cl.⁵ ............................................. B41J 3/12
[52] U.S. Cl. ................................... 400/322; 400/320; 400/121; 400/341; 101/93.09
[58] Field of Search ............... 400/320, 322, 323, 341, 400/121; 310/12; 101/93.04, 93.05, 93.09

[56] References Cited

U.S. PATENT DOCUMENTS

| | | | |
|---|---|---|---|
| 2,846,623 | 8/1958 | Wolff | 317/180 |
| 3,001,092 | 9/1961 | Nemeth | 310/37 |
| 3,509,981 | 5/1970 | Hylan | 400/322 |
| 3,694,782 | 9/1972 | Ray | 335/230 |
| 3,771,034 | 11/1973 | Wallskog | 400/322 X |
| 3,952,217 | 4/1976 | Rawlings | 310/36 |
| 4,072,101 | 2/1978 | Garcia | 400/320 X |
| 4,084,681 | 4/1978 | Heinzl | 400/320 X |
| 4,151,447 | 4/1979 | von der Heide | 400/322 X |
| 4,219,825 | 8/1980 | Heyraud et al. | 101/93.29 X |
| 4,227,455 | 10/1980 | Pennebaker | 101/93.04 X |
| 4,239,403 | 12/1980 | Matula | 400/322 |
| 4,278,019 | 7/1981 | Meier | 400/121 X |
| 4,359,289 | 11/1982 | Barrus | 400/322 X |
| 4,445,798 | 5/1984 | Munehiro | 400/322 X |
| 4,507,634 | 3/1985 | Vanderlaan | 310/36 X |
| 4,534,287 | 8/1985 | Meloni | 400/124 X |
| 4,572,685 | 2/1986 | Matsumoto | 400/320 |

FOREIGN PATENT DOCUMENTS 163673 9/1983 Japan ........................... 400/341

Primary Examiner—Paul T. Sewell
Attorney, Agent, or Firm—Davis, Bujold & Streck

[57] ABSTRACT

An improvement to a dot matrix printer of the shuttle variety wherein a printhead is oscillated from side to side within a printer base. The shuttle is disposed within a ballistic energy transfer device mounted for oscillating movement from side to side in the opposite direction to the instantaneous movement of the shuttle. A rebound spring is operably connected to exert a rebounding force against the shuttle to aid it in reversing direction. Also, a centering spring is operably connected for exerting a centering force against the ballistic energy transfer device. A linear motor is connected for driving the shuttle back and forth in an oscillating motion with respect to the ballistic energy transfer device. Optionally, the linear motor is connected for driving the ballistic energy transfer device back and forth in an oscillating motion with respect to the printer base. The turnaround time of the shuttle is adjusted by adjusting the span of the shuttle or the spring constant of the rebound spring. Linear encoders are provided to determine the shuttle position as the shuttle moves back and forth.

55 Claims, 12 Drawing Sheets

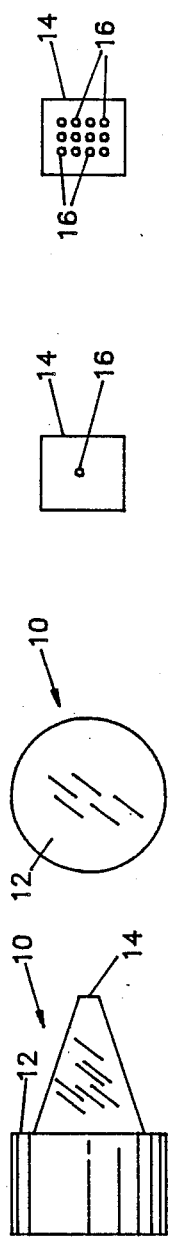
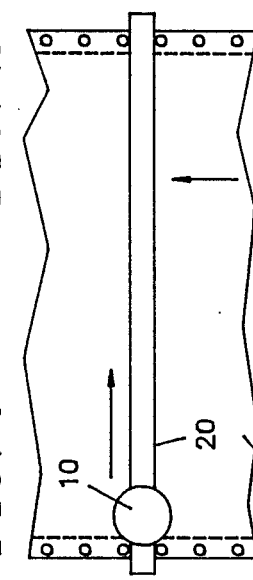
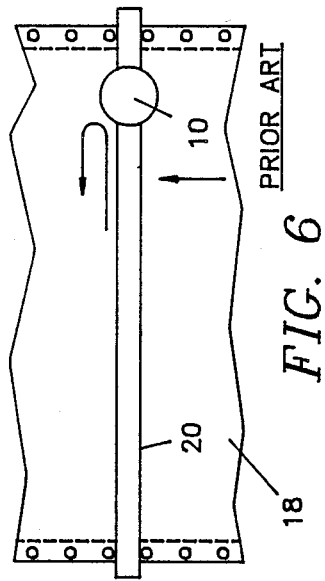
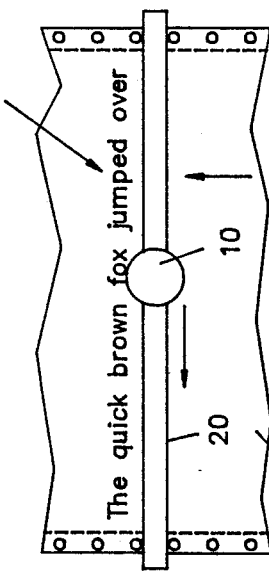

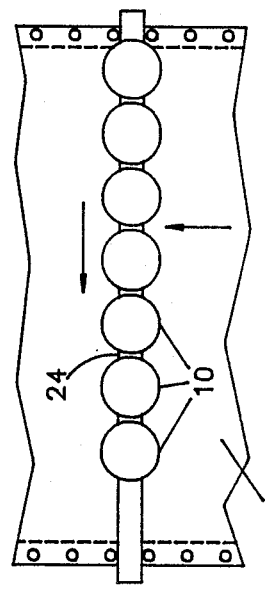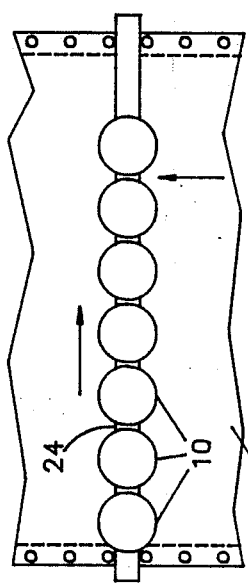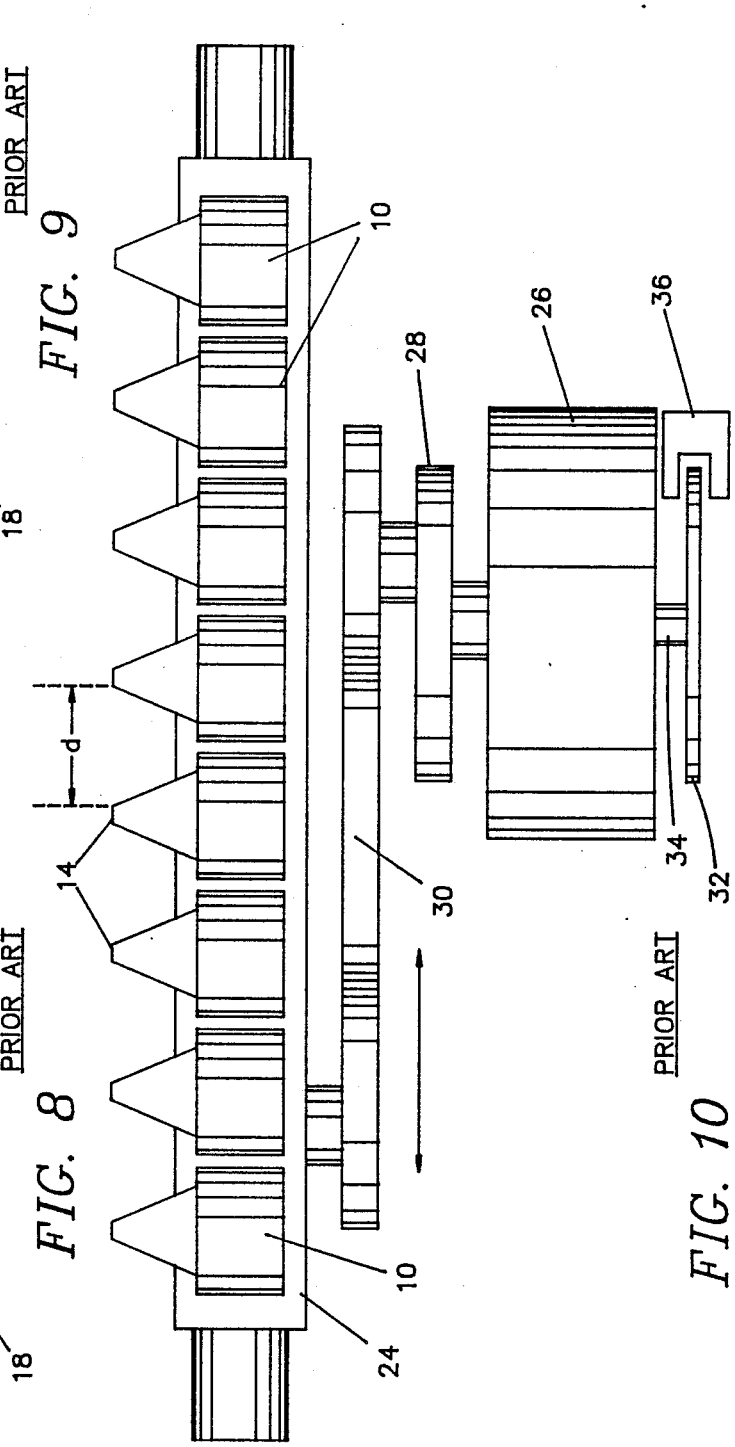

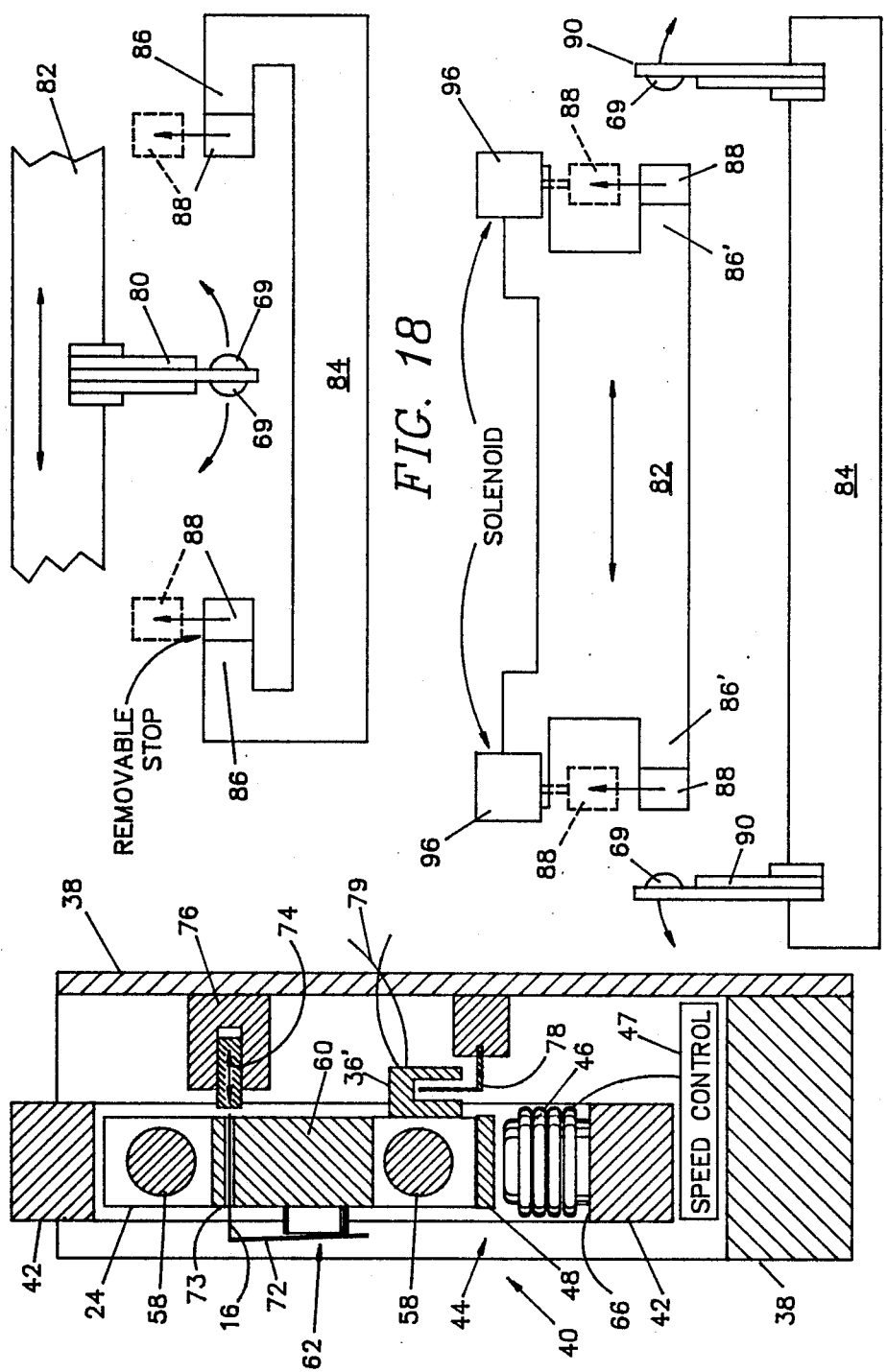

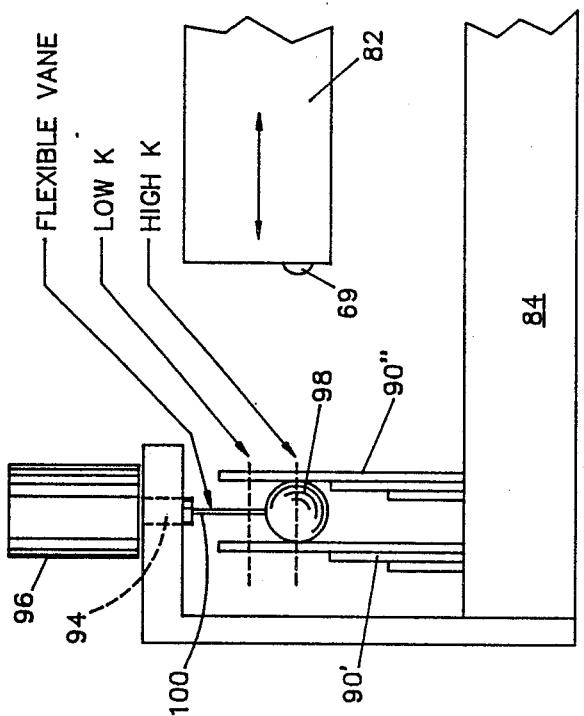
FIG. 21
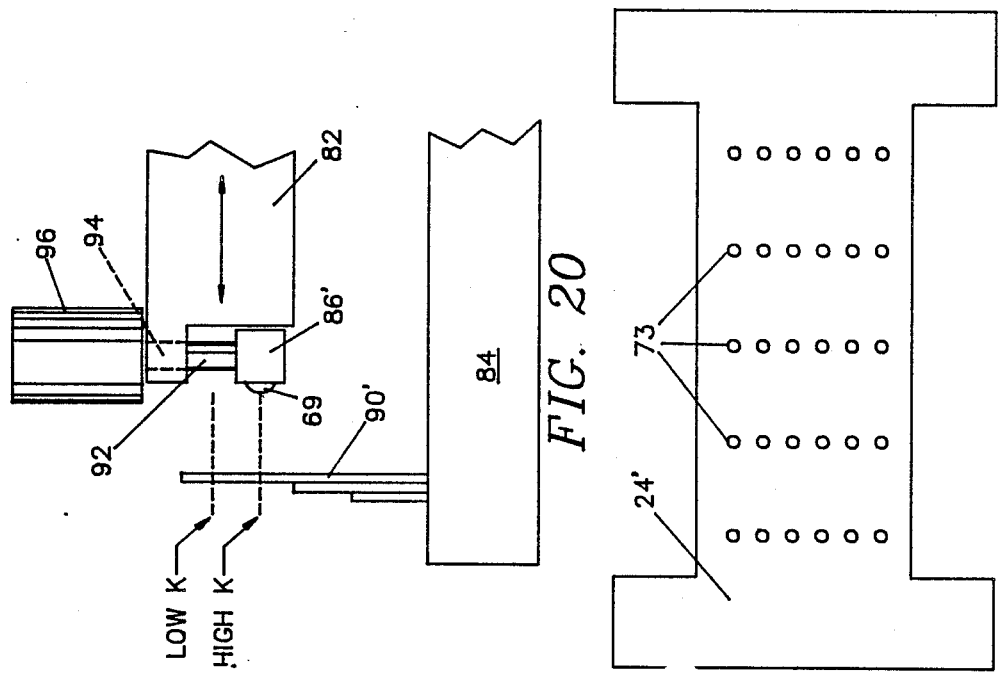
FIG. 22
FIG. 20

HIGH SPEED SHUTTLE PRINTER

BACKGROUND OF THE INVENTION

The present invention relates to dot matrix printers and, more particularly, in a dot matrix printer of the shuttle variety wherein a plurality of printheads are disposed across the width of a shuttle which is oscillated from side to side within a printer base, to the improvement comprising, the shuttle being disposed within a ballistic energy transfer device mounted for oscillating movement from side to side in the opposite direction to the instantaneous movement of the shuttle; first spring means operably connected between the ballistic energy transfer device and the shuttle for exerting a rebounding force against the shuttle to aid it in reversing direction; and, second spring means operably connected for exerting a centering force against the ballistic energy transfer device.

Dot matrix printers have provided a simple and economical apparatus for computer-driven printing. In a dot matrix printer, a printhead such as that labelled as 10 in FIGS. 1 and 2 has a magnetic drive unit 12 connected to a print face 14 such as those shown by way of example in FIGS. 3 and 4. One or more print pins 16 are connected between the drive unit 12 and the print face 14. For example, FIG. 3 depicts a single print pins 16 while FIG. 4 depicts twelve print pins 16 configured in a 3×4 matrix. A print ribbon (not shown) is disposed between the print face 14 and the writing paper upon which printing is to take place. When the magnetic drive unit 12 pushes the pin(s) 16 out of the print face 14, the end(s) push the print ribbon against the paper causing a dot to be printed. Dot matrix printers are powerful in capability since they can produce both text (i.e. alpha-numeric characters) and graphics as a matrix of dots on the page. The process is depicted in FIGS. 5–7. The printhead 10 is moved back and forth transversely over the paper 18 as the paper is moved vertically under the support bar 20 carrying the printhead 10. The printhead 10 and paper 18 are moved by apparatus well known in the art which is, therefore, not shown for simplicity. Likewise, the magnetic drive unit 12 is activated under computer control in a manner well known to those skilled in the art which requires no further explanation. The printhead 10 is moved across the bar 20 from a starting position at the left side of the paper 18 as shown in FIG. 5 to the opposite side of the paper 18 where it reverses direction as depicted in FIG. 6. It continues across the paper in the opposite direction as depicted in FIG. 7 until it reaches its starting point once again. The process then repeats. As the printhead 10 moves across the paper 18, the magnetic drive unit 12 is activated to create one or more lines of dots (depending on the number of print pins 16) which comprise the graphics and/or text 22. The more pins 16, the fewer passes of the printhead 10 are required.

As with anything else, dot matrix printers are subject to numerous tradeoffs. A printer with only a few pins 16 is simple and inexpensive to build. Typically, these are very slow. A printhead 10 with a greater number of pins will be faster for a given quality; however, the cost is high and the printhead is large. To move the high mass of such a printhead across the paper rapidly and then quickly reverse its direction requires a large and expensive drive mechanism. Even then, there are limitations as to how fast one can make the printhead traverse a wide sheet of paper (e.g. fourteen inches) and then reverse direction.

In commercial printers where cost is not a major factor (as compared to the "home" market), shuttle printers such as that depicted in FIGS. 8–10 have been introduced as an answer to the above-mentioned problems of single printhead dot matrix printers. In a shuttle printer, a plurality of printheads 10 are disposed side-by-side on a shuttle 24. The shuttle 24 is then oscillated or shuttled from side to side a shuttle distance "d" as depicted in the figures. Each head 10 covers only a narrow vertical strip on the paper. For example, with eight printheads 10 as shown in FIG. 10, the shuttle 24 only has to move one-eighth the distance required to traverse the whole width of the paper with one printhead. Typically, the side-to-side movement of the shuttle 24 has been created by a rotating motor 26 driving a crank 28 which, in turn, reciprocates a link 30 connected to the shuttle 24. A position wheel 32 attached to the end of the motor shaft 34 is sensed by a sensor 36 to provide a signal of the position of the shuttle 24 as function of the rotation of the crank 28.

As can be appreciated, while solving some problems, shuttle printers have created problems of their own. Principally, the shuttle 24 with its multiple printheads 10 has a high inertial mass. Thus, it is hard to reverse to create the desired shuttle motion. Additionally, the sensor 36 is inexact since it is at the far end of a chain of additive errors from the shuttle 24 itself. To keep the mass low, shuttle printers have typically employed single pin printheads as depicted in FIG. 3. This, of course, means that many more passes or "shuttles" are required to create a finished "line" of text or the like.

Wherefore, it is an object of the present invention to provide a shuttle printer which is able to quickly reverse directions.

It is another object of the present invention to provide a shuttle printer which operates with larger, multiple pin printheads so as to require fewer shuttle motions to create a line of text or the like.

It is yet another object of the present invention to provide a shuttle printer which can be dynamically adjusted for maximum performance.

It is still another object of the present invention to provide a shuttle printer which does not impart high impact forces from the moving shuttle to the printer base.

It is a further object of the present invention to provide a shuttle printer having a position feedback system for the shuttle which accurately reflects the position of the shuttle.

It is still a further object of the present invention to provide a shuttle printer having low friction in the components whereby to achieve maximum benefit from the driving power.

Other objects and benefits of the present invention will become apparent from the description which follows hereinafter when taken in conjunction with the drawing figures which accompany it.

SUMMARY

The foregoing objects have been achieved in a dot matrix printer of the shuttle variety wherein a plurality of printheads are disposed across the width of a shuttle which is oscillated from side to side within a printer base by the improvement of the present invention comprising, the shuttle being disposed within a ballistic energy transfer device mounted for oscillating movement from side to side in the opposite direction to the instantaneous movement of the shuttle; first spring means operably connected between the ballistic energy transfer device and the shuttle for exerting a rebounding force against the shuttle to aid it in reversing direction; and, second spring means operably connected for exerting a centering force against the ballistic energy transfer device. Preferably, the ballistic energy transfer device is of a mass which is at least several times the mass of the shuttle.

In one version, there are a pair of spaced, parallel support rods carried by the printer base; means for slidably mounting the shuttle to the support rods; and, means for slidably mounting the ballistic energy transfer device to the support rods. Additionally, there is a linear motor operably connected between the shuttle and the ballistic energy transfer device for driving the shuttle back and forth in an oscillating motion with respect to the ballistic energy transfer device. According to one aspect, the linear motor comprises a linear armature carried by the shuttle and a linear coil assembly carried by the ballistic energy transfer device.

In the preferred embodiment, the invention additionally comprises a first linear encoder fence carried by the printer base to be parallel to a path of movement of the shuttle, the first fence having sensible positional indicia thereon and first sensor means carried by the shuttle for sensing the positional indicia of the first encoder fence as the shuttle moves back and forth and for producing a signal at an output thereof reflecting the position of the shuttle with respect to the printer base. Preferably, the first encoder fence is of a transparent material and the first sensor means includes a light emitting diode disposed on one side of the first fence and a phototransistor disposed on the opposite side of the first fence so as to develop the signal as a function of light passage through the positional indicia on the first fence.

In the instances where the linear motor is a stepper motor, there is also a second linear encoder fence carried by the shuttle having sensible positional indicia thereon and second sensor means carried by the ballistic energy transfer device for sensing the positional indicia of the second encoder fence as the shuttle moves back and forth and for producing a signal at an output thereof reflecting the position of the shuttle with respect to the ballistic energy transfer device whereby the linear motor is more easily controlled.

Also in the preferred embodiment, speed control circuit means are operably connected to the linear motor for adjustably controlling the speed of the shuttle. The preferred speed control circuit means includes means for adjusting the speed of the shuttle from between 5 inches per second and 100 inches per second.

The preferred first spring means comprises a pair of impact pads carried by respective ends of the shuttle and a pair of second springs carried by the ballistic energy transfer device at the ends of a span of movement of the shuttle to be contacted by respective ones of the impact pads whereby the second springs are compressed and then rebound to urge the shuttle in the opposite direction. For optimum energy conservation, the impact pads are disposed on a line running through the center of gravity of the shuttle whereby sideward, friction producing forces against the shuttle by the second springs are minimized. Also preferably, the second springs are leaf springs supported by the ballistic energy transfer device at ends thereof; the second springs are positioned transverse the path of travel of the shuttle to be impacted and deflected at a center thereof by the impact pads; and, the second springs have a spring constant chosen to turnaround the movement of the shuttle in less than 3 milli seconds.

Additionally for the purposes of energy conservation, first balancing means are connected to the ballistic energy transfer device for eliminating forces therefrom sideward to the path of movement thereof and second balancing means are connected to the shuttle for eliminating forces therefrom sideward to the path of movement thereof. Also, there are first support means for frictionlessly supporting a portion of the weight of the shuttle to reduce the frictional drag thereon during movement thereof and second support means for frictionlessly supporting a portion of the weight of the ballistic energy transfer device to reduce the frictional drag thereon during movement thereof. The preferred first support means comprises a magnetically attractable plate attached to a top surface of the shuttle and a magnet supported above the shuttle close adjacent the plate to attract the plate and thereby support a portion of the weight of the shuttle. The preferred second support means comprises a coil spring disposed vertically between a bottom of the printer base and the ballistic energy transfer device.

An alternate version of the linear motor comprises a vertical member carried by the shuttle and a solenoid assembly carried by the ballistic energy transfer device and having a moving member operably connected to the vertical member.

In one variation, the ballistic energy transfer device is part of the printer base. To accomplish that, there is an embodiment wherein there is a support rod carried by the ballistic energy transfer device; means for slidably mounting the shuttle to the support rod; and, means for supporting the ballistic energy transfer device for the oscillating movement wherein the means for supporting the ballistic energy transfer device for the oscillating movement comprises a pair of leaf springs disposed vertically between a bottom portion of the printer base and the ballistic energy transfer device. In another variation, the entire printer base is the ballistic energy transfer device with the printer base mounted on compliant rubber feet to accomodate the movement of the printer base.

DESCRIPTION OF THE DRAWINGS

FIG. 1 is a simplified side view of a prior art dot matrix printhead.

FIG. 2 is a rear view of the printhead of FIG. 1.

FIG. 3 is a front view of the printhead of FIG. 1 in an embodiment wherein the printhead only has one print wire emerging therefrom.

FIG. 4 is a front view of the printhead of FIG. 1 in an embodiment wherein the printhead has a plurality of print wires emerging therefrom.

FIG. 5 is a simplified drawing showing the way in which a prior art dot matrix printer of the non-shuttle variety starts the movement of its printhead across a page to be printed.

FIG. 6 shows the prior art dot matrix printer of FIG. 5 at the end of movement of its printhead across a page to be printed and returning in the opposite direction.

FIG. 7 shows the prior art dot matrix printer of FIGS. 5 and 6 with its printhead returning across a page to be printed towards the point cf origin with a line of text printed.

FIG. 8 is a simplified drawing showing the way in which a prior art dot matrix printer of the shuttle variety starts the movement of its multiple printheads in one direction across a page to be printed.

FIG. 9 shows the prior art shuttle printer of FIG. 8 returning in the opposite direction.

FIG. 10 is a plan view of the shuttle of a typical prior art dot matrix printer of the shuttle variety and its manner of generation of shuttle motion of the multiple printheads carried thereby by means of a rotary motor and crank.

FIG. 17 is a cutaway end view through the shuttle printer of FIG. 15 in the plane XVII-XVII.

FIG. 18 is a simplified front view showing one way of causing a variable rebound force and turnaround point in apparatus according to the present invention.

FIG. 19 is a simplified front view showing another way of causing a variable rebound force and turnaround point in apparatus according to the present invention.

FIG. 20 is a more detailed drawing of how a solenoid carried by a moving member can be employed to cause a variable rebound force and turnaround point in apparatus according to the present invention.

FIG. 21 is a more detailed drawing of how a solenoid carried by a stationary member can be employed to cause a variable rebound force and turnaround point in apparatus according to the present invention.

FIG. 22 is a drawing of a shuttle according to the present invention adapted for used in a "focused" mode of operation wherein a plurality of multi-pin printheads are employed across the width of the shuttle.

DESCRIPTION OF THE PREFERRED EMBODIMENT

Figure 11:
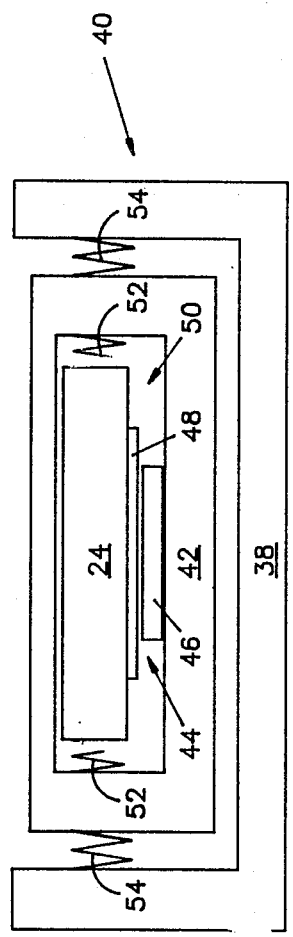
FIGS. 11-13 are simplified drawings depicting the basic manner of operation of the present invention.
Figure 12:
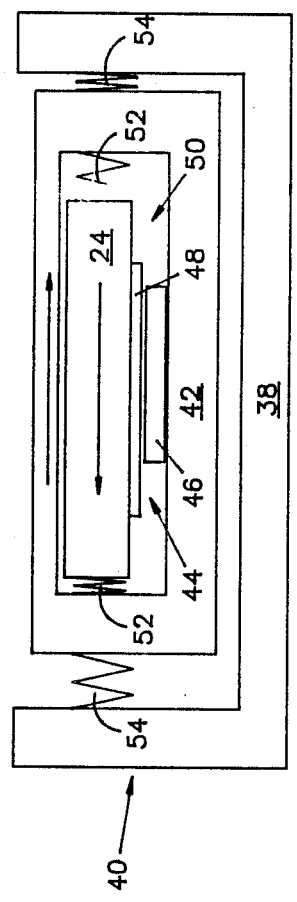
Figure 13:
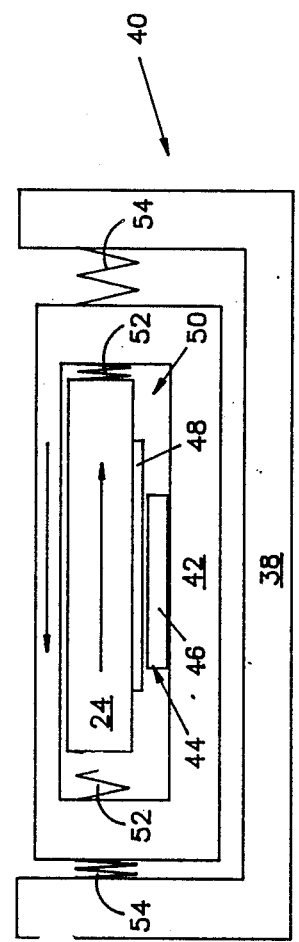

The basic philosophy of the present invention is depicted in simplified form in FIGS. 11-13. Rather than slidably connecting the shuttle 24 to the printer base 38 as in the prior art, the shuttle printer 40 of the present invention employs a ballistic energy transfer device 42 to carry the shuttle 24. The ballistic energy transfer device 42 is of a mass which, preferably, is (but need not be) at least several times the mass of the shuttle 24. Preferably, the ballistic energy transfer device 42 is about five times the mass of the shuttle 24. There is a tradeoff which the designer must take into consideration when designing a printer employing the present invention. The distance and speed of movement of the ballistic energy transfer device 42 is in the same ratio as its mass is to the mass of the shuttle 24; that is, in the case where the ballistic energy transfer device 42 is ten times the mass of the shuttle 24, the ballistic energy transfer device 42 will move 1/10 the distance at 1/10th the speed of the shuttle 24. Thus, by making the mass of the ballistic energy transfer device 42 very large, it can be made to move very slightly from side to side at a lower velocity while the shuttle 24 moves quickly through its full oscillation cycle to produce the lines of printing. The ballistic energy transfer device 42 acts to greatly reduce the energy required to drive the shuttle 24. In embodiments tested by the inventors herein, a 90% energy transfer (i.e. only 10% of the energy is lost) appears to be attainable.

The shuttle 24 is directly driven longitudinally by a linear motor 44 (or other linear drive device) instead of by the crank and link system of the prior art as described earlier herein. The coils 46 are carried by the ballistic energy transfer device 42 and the armature 48 is carried by the shuttle 24 as shown in the figures. Note that the preferred configuration is with the ballistic energy transfer device 42 rectangular in shape with a rectangular opening 50 in the center thereof into which the rectangular shuttle 24 is disposed. As will be seen in one embodiment to be described hereinafter, it is possible to employ the printer base 38 as the ballistic energy transfer device 42 if desired. The shuttle 24 is positioned between a pair of rebound springs 52. In the preferred embodiment, the spring constant of the springs 52 is chosen so as to be able to impart a force to the shuttle 24 which can affect turnaround of the shuttle 24 in less than 3 ms. Turnaround times of less than 1 ms have already been achieved with this mechanism in tested embodiments thereof. It should be noted in this regard that the turnaround time of the shuttle 24 is independent of the speed thereof—within the safe stress limits of the springs 52. In similar manner, the ballistic energy transfer device 42 is positioned between a pair of centering springs 54 carried by the end walls 56 of the printer base 38. The spring constant cf the springs 54 is chosen so as to only center the ballistic energy transfer device 42 in the static state. That is their only function and their spring constant should not be large enough to affect the operation of the mechanism in other ways. As can be appreciated, the above-described configuration results in a quick reversal of the shuttle 24 at the ends of its oscillation (e.g. under 3 ms) without the transfer of forces into the printer base 38. The shuttle 24 and ballistic energy transfer device 42 move in opposite directions as depicted in the drawing figures. Note that, for simplicity, the drawings are not to scale in this regard. The ballistic energy transfer device 42 and the shuttle 24 are easily reversed without the imparting of large forces into the printer base 38. Most of the kinetic energy is transferred by the ballistic energy transfer device 42 back to the shuttle 24 and never reaches the printer base 38. It should be noted at this point that while springs are shown and described herein for various functions, it is anticipated that magnet pairs could be substituted for the springs, if desired, with like poles adjacent one another so as to create and employ a magnetic repulsion force in lieu of a spring force.

Figure 14:
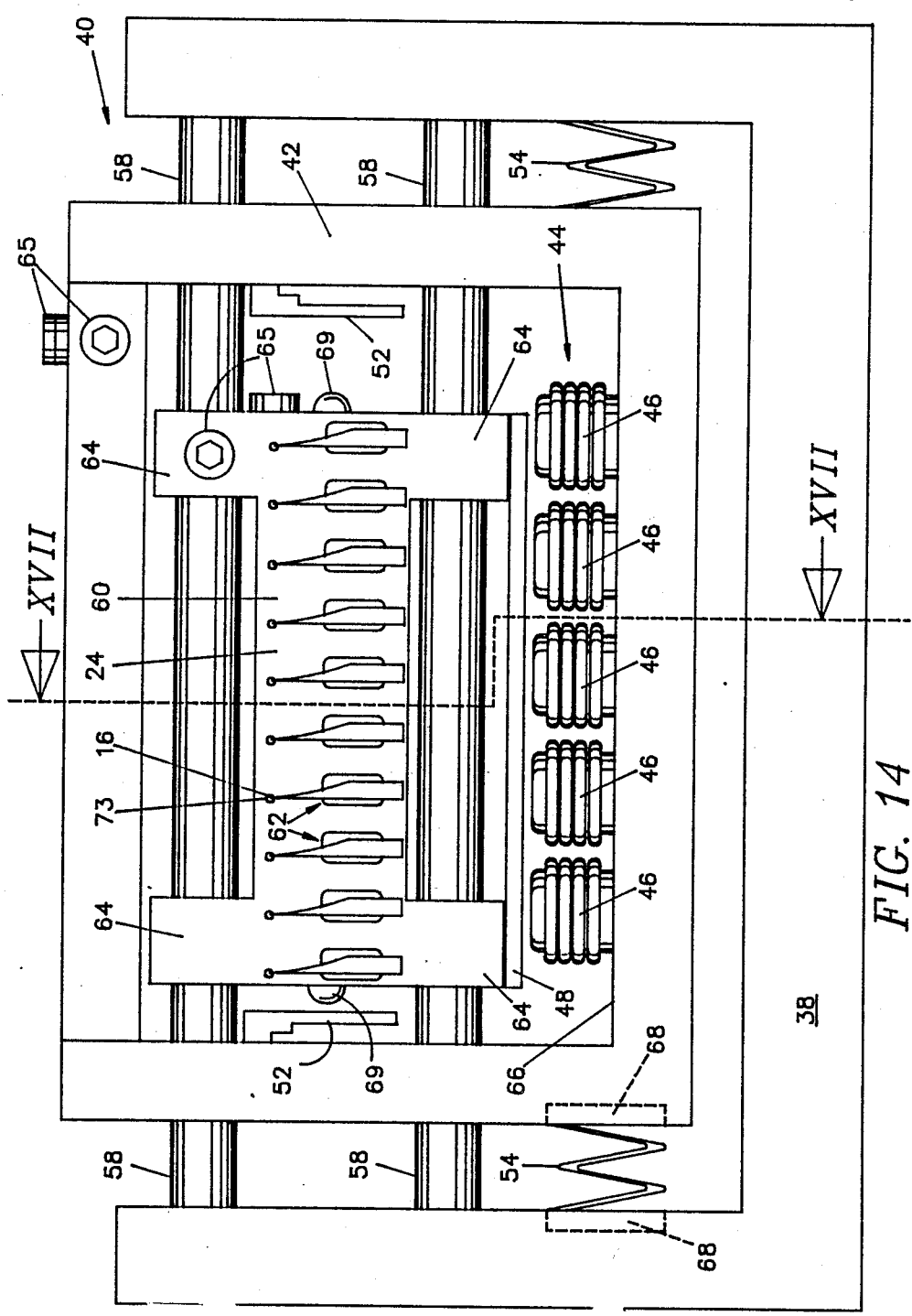
FIG. 14 is a more detailed front view of a shuttle printer according to the present invention in a first embodiment wherein only the shuttle is motor driven.
Figure 15:
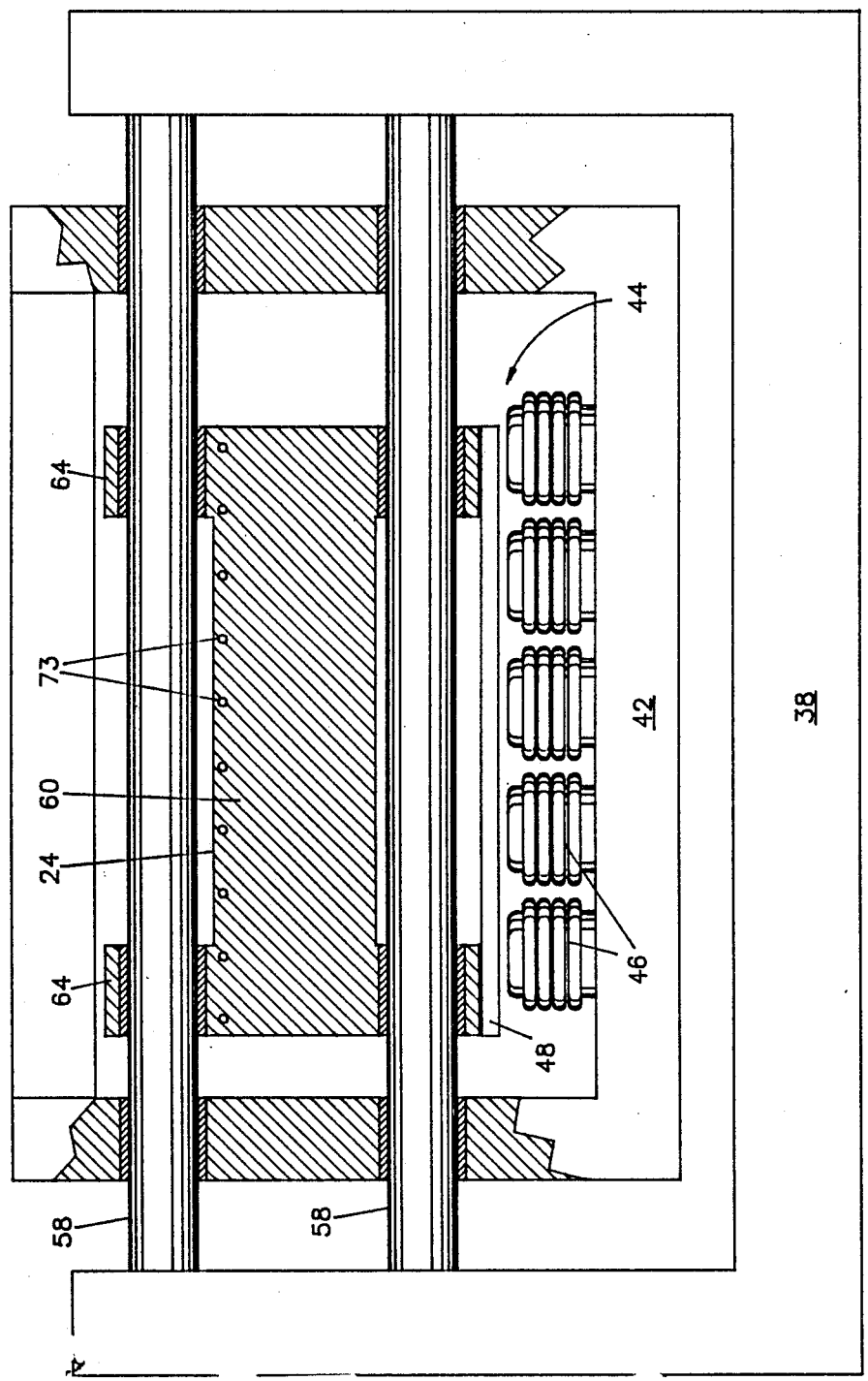
FIG. 15 is a partially cutaway drawing of the shuttle printer of FIG. 14 showing the manner in which the shuttle and inertia ballistic energy transfer device are slidably mounted on common shafts carried by the printer base.
Figure 16:
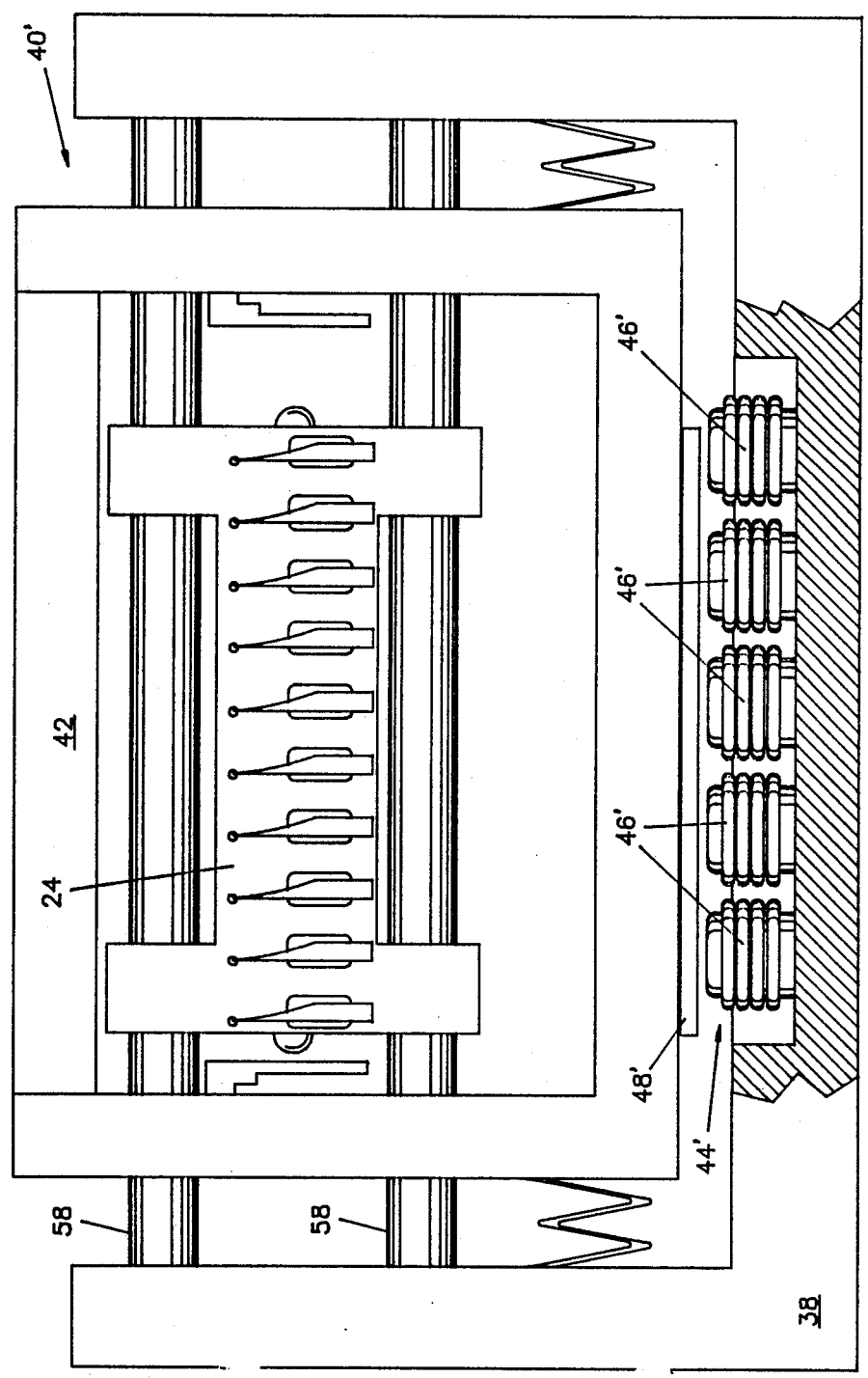
FIG. 16 is a more detailed front view of a shuttle printer according to the present invention in a second embodiment wherein both the shuttle and inertia ballistic energy transfer device are motor driven.

The shuttle printer 40 of the present invention is shown in greater detail in FIGS. 14, 15 and 17 with an alternate embodiment, 40,, employing a power drive for the ballistic energy transfer device 42 instead of for the shuttle 24 shown in FIG. 16. As those skilled in the art will appreciate, either device (i.e. the ballistic energy transfer device 42 or the shuttle 24) can be the driven device in a printer according to the present invention. In all other regards, the embodiment of FIG. 16 is virtually identical to the embodiment of FIGS. 14, 15 and 17 and, therefore, &.he embodiment of FIG. 16 will not be addressed further herein in the interest of simplicity and the avoidance of redundancy.

The shuttle 24 and ballistic energy transfer device 42 are slidably mounted on a pair of shafts 58 carried by the printer base 38. To date, acceptable performance has been achieved by having narrow points of contact with the shafts 58 and the use of phosphor bronze bushings, or the like. If desired, other forms of low friction mountings or support could be employed in lieu of or in addition to the mountings shown. For example, magnetic fields and/or springs could be disposed to support the weight of the ballistic energy transfer device 42. This will be shown in other embodiments to be described later herein.

The preferred ballistic energy transfer device 42 is an open rectangle in shape and, therefore, already suited for the low contact mounting on the shafts 58 described above. The shuttle 24 is generally "H" shaped having a rectangular body portion 60 carrying a plurality of pin drivers 62 disposed in side-by-side relationship. Four legs 64 extend outward from the corners of the body portion 60. The shafts 58 pass through respective pairs of the legs 64 as shown. The linear motor armature 48 is attached to the two bottom legs 64. The coils 46 are linearly attached to the bottom 66 of the ballistic energy transfer device 42 to position the coils 46 along the armature 48 in close spaced relationship thereto. The coils 46 are operably connected to a power source (not shown) through speed control circuit 47 which allows the speed of movement of the shuttle 24 to be varied for different printing conditions. For example, the inventors herein have determined that &:he speed of the shuttle 24 should be variable from 5 inches/sec to 100 inches/sec in order to allow for a wide range of font selections and graphics resolutions. The preferred centering springs 54 are weak coil springs carried between holes 68 in the printer base 38 and the ballistic energy transfer device 42 provided therefor. The preferred rebound springs 52 are leaf springs which are contacted by impact pads 69. The rebound springs 52 are much more critical and will be returned to in greater detail shortly.

As best seen from the cutaway view of FIG. 17, the pin drivers each comprise a coil 70 for attracting a spring-loaded armature 72. The end of the armature 72 is connected to one end of a print pin 16 which passes through a bore 73 in the body portion 60 provided therefor. The other end of each print pin 16 emerges close adjacent an adjustable platen 74 carried by block 76 attached to the printer base 38. A plastic encoder "fence" 78 is also carried by the printer base 38 to be parallel to the path of movement of the shuttle 24. A sensor 36' is carried by the shuttle 24 to sense the encoder fence 78 as the shuttle 24 moves back and forth and develop a positional signal on its output wires 79 indicating the position of the shuttle 24 with respect to the printer base 38. In its preferred embodiment, the encoder fence 78 is of transparent plastic and the sensor 36' is of the type that has a light emitting diode on one side of the fence 78 and a phototransistor on the opposite side so as to develop an electrical position signal on wires 79 as a function of light passage through positional indicia on the fence 78.

In initial testing of the present invention, it has been found to be beneficial to be able to adjust the length of travel of the shuttle 24. While not determined to be as important as of this time, it may also be desirable to apply the same provision with respect to the ballistic energy transfer device 42 and its centering springs 54. Therefore, it is preferred that such provisions be included within a shuttle printer made and operating in accordance with the teachings of the present invention. Several methods and associated apparatus for this purpose will now be discussed.

In the approach of FIG. 18, a single leaf spring 80 adapted for bilateral movement as indicated by the arrows is carried by the moving member 82. The bilateral leaf spring 80 is provided with an impact pad 69 on either side at the intended points of contact. The stationary member 84 is provided with a stop block 86 at each end of the span of travel of the spring 80. The stop block 86 is provided with one or more removable stops 88. If desired, the stops 88 can be added or removed by a solenoid (not shown) or the like. Note in this embodiment that the length of the span is changeable in a fixed amount while the spring constant, k, of the spring 80 remains the same.

A variation of the approach of FIG. 18 is shown in FIG. 19. In this embodiment, the length of the span is again changeable while the spring constant of the spring 80 remains the same. A pair of unidirectional single leaf springs 90 are attached to the stationary member 84 at each end of the span of travel. Each leaf spring 90 is provided with an impact pad 69 on its inside face at the intended point of contact. Each end of the moving member 82 is provided with a stop block 86' which, in turn, is once again provided with one or more removable stops 88. As in the previous embodiment, if desired, the stops 88 can be added or removed by the solenoid 96 or the like.

A pair of preferred approaches are shown in FIGS. 20 and 21. The approach of these figures is similar to the approach of FIG. 19 above. In these embodiments, however, the change in span of travel is precipitated by changing the spring constant, k, of the associated spring. With reference first to FIG. 20, a unidirectional, variable spring constant leaf spring 90' is once again carried by the stationary member 84 at each end of the span of travel (only one being shown in the drawing for simplicity). The stop block 86, of this embodiment is a movable block carried on the end of a rod 92 carried by the armature 94 of a solenoid 96. By activating the solenoid 96, the contact position of the impact pad 69 carried by the stop block 86' can be changed so as to contact the spring 90, along its length at a low k position or a high k position. As those skilled in the art will readily recognize and appreciated, by replacing the two position solenoid 96 with a variably positionable device, of course, more variations in the k of the spring 90, (and, therefore, variations in the span of the moving member 82) can be achieved.

A variation of this general approach is shown in FIG. 21 where the solenoid 96 is mounted above the spring 90'. A force transfer ball 98 is attached to one end of a flexible vane 100 carried on the other end by the armature 94 of the solenoid 96 (or, optionally, a variable position device as mentioned above). The ball 98 can be moved along the spring 90, between positions of low k and high k as indicated in the drawing. A force transfer spring 90" is positioned on the other side of the ball 98 to be contacted along its length by the impact pad 69 carried by the end of the moving member 82. As can be appreciated, the spring constant of the springs 90' and 90" is additive and should be considered when calculating the parameters of each. When the impact pad 69 strikes the spring 90", it (at a constant k) transfers the force to the ball 98 at its point of contact with the spring 90". The ball 98, in turn, transfers the force to the spring 90' at its point of contact. The spring 90' provides a variable k of resistive force as a function of the position of the ball 98 on its length.

Another important aspect of the present invention determined by testing of the inventors herein is the need to balance the system in order to minimize energy loss during operation. As shown in FIG. 14, balancing of both the ballistic energy transfer device 42 and shuttle 24 is preferably accomplished by adding weights 65 at appropriate locations so that the rebound force is through the center of gravity. This results in virtually no sideward, friction producing components of the energy force within the sliding surfaces of the system with resultant rebound energy loss. As a consequence, energy conservation is maximized and driving energy requirements are minimized. The weights 65 can be of fixed weight or made to be adjustable, as desired. Alternatively, of course, instead of adding weight at light points to balance the system, weight could be removed from heavy points (as by drilling) to accomplish the same result.

Figure 23:
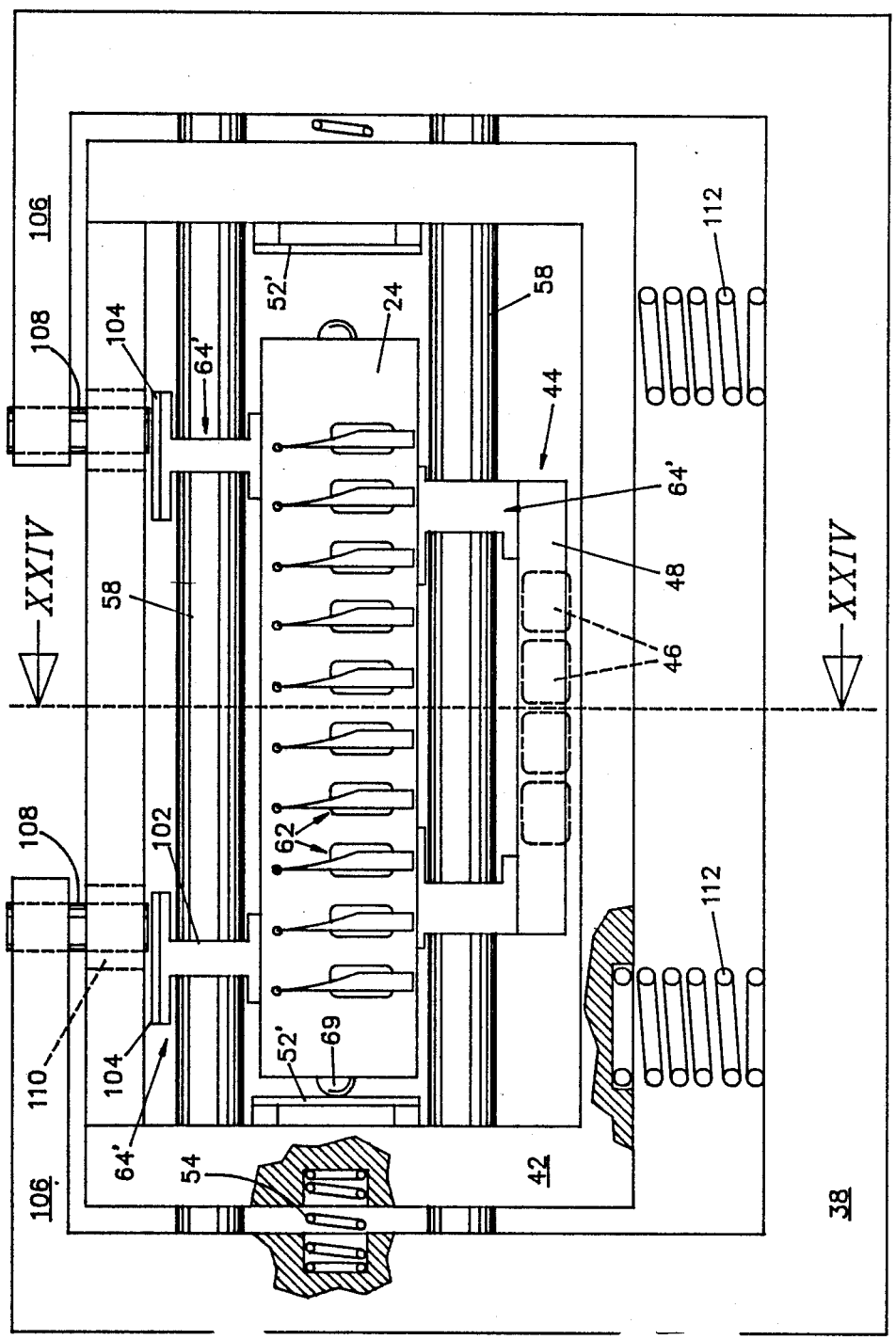
FIG. 23 is a partially cutaway, simplified, front view of a printer according to the present invention in a first preferred embodiment thereof.
Figure 24:
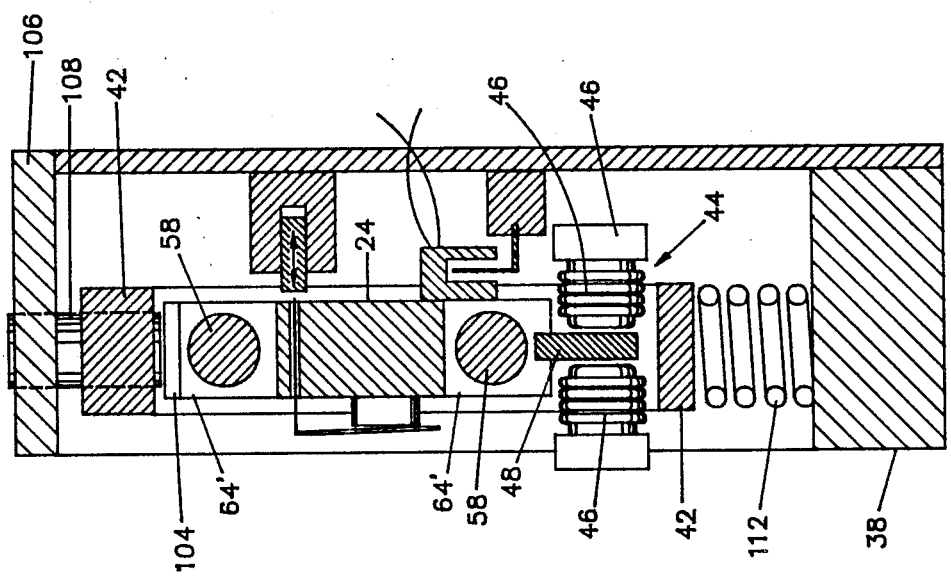
FIG. 24 is a cutaway end view through the printer of FIG. 23 in the plane XXIV—XXIV.

Turning now to FIGS. 23-26, two embodiments of the present invention in its best mode as presently contemplated following testing of various approaches will now be described. In the embodiment of FIGS. 23 and 24, the shuttle 24 is still slidably mounted between the pair of shafts 58. The legs 64,, however, have been reduced to a thin web 102 where they contact the shafts 58 so as to reduce possible friction. The tops of the upper legs 64' have a ferrous plate 104 attached thereto. The printer base 38 has a pair of horizontal arms 106 extending out over the top of the ballistic energy transfer device 42 and parallel thereto. The arms 106 each carry a magnet 108 which passes through a slot 110 in the ballistic energy transfer device 42 into close-spaced proximity to the adjacent plate 104 to create an attracting and lifting force therein which tends to frictionlessly support a portion of the weight of the shuttle 24 and thereby reduce the friction associated with its sliding movement along the shafts 58. In like manner, the ballistic energy transfer device 42 is supported on a pair of vertically mounted coil springs 112 which frictionlessly support a portion of the weight of the ballistic energy transfer device 42 while allowing side to side movement thereof and thereby reduce the friction associated with its sliding movement along the shafts 58. This in combination with the balancing described above minimizes the energy loss of the shuttle 24 and the ballistic energy transfer device 42 through friction. Note also that the size of the armature 48 has been reduced and it is mounted vertically between two opposed rows of coils 46 to provide the linear motor 44. In addition to reducing the amount of area which is in sliding contact with the shafts 58, the construction as shown concentrates the majority of the mass of the shuttle 24 along the center line thereof passing through the contacting impact pads 69. Note that in this embodiment the rebound springs 52, are flexure springs supported at both ends so as to provide a stiff, quick acting, flicking action in rebounding the shuttle 24 for minimization of the turnaround time. Note also that in this embodiment the centering springs 54 are disposed along the centerline of the system between the shafts 58 so as to impart virtually no sideward forces (even minimal ones) against the ballistic energy transfer device 42 which might cause friction producing results.

Figure 26:
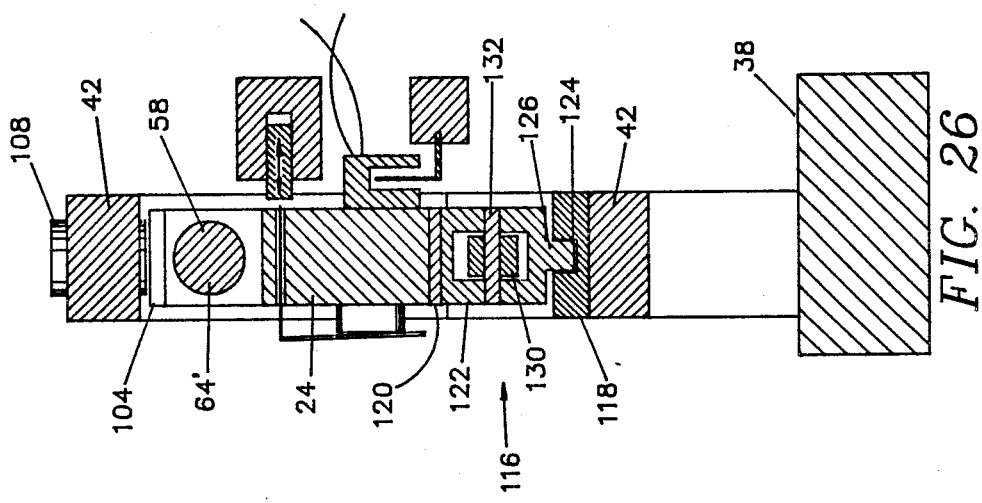
FIG. 26 is a cutaway end view through the printer of FIG. 25 in the plane XXVI—XXVI.
Figure 25:
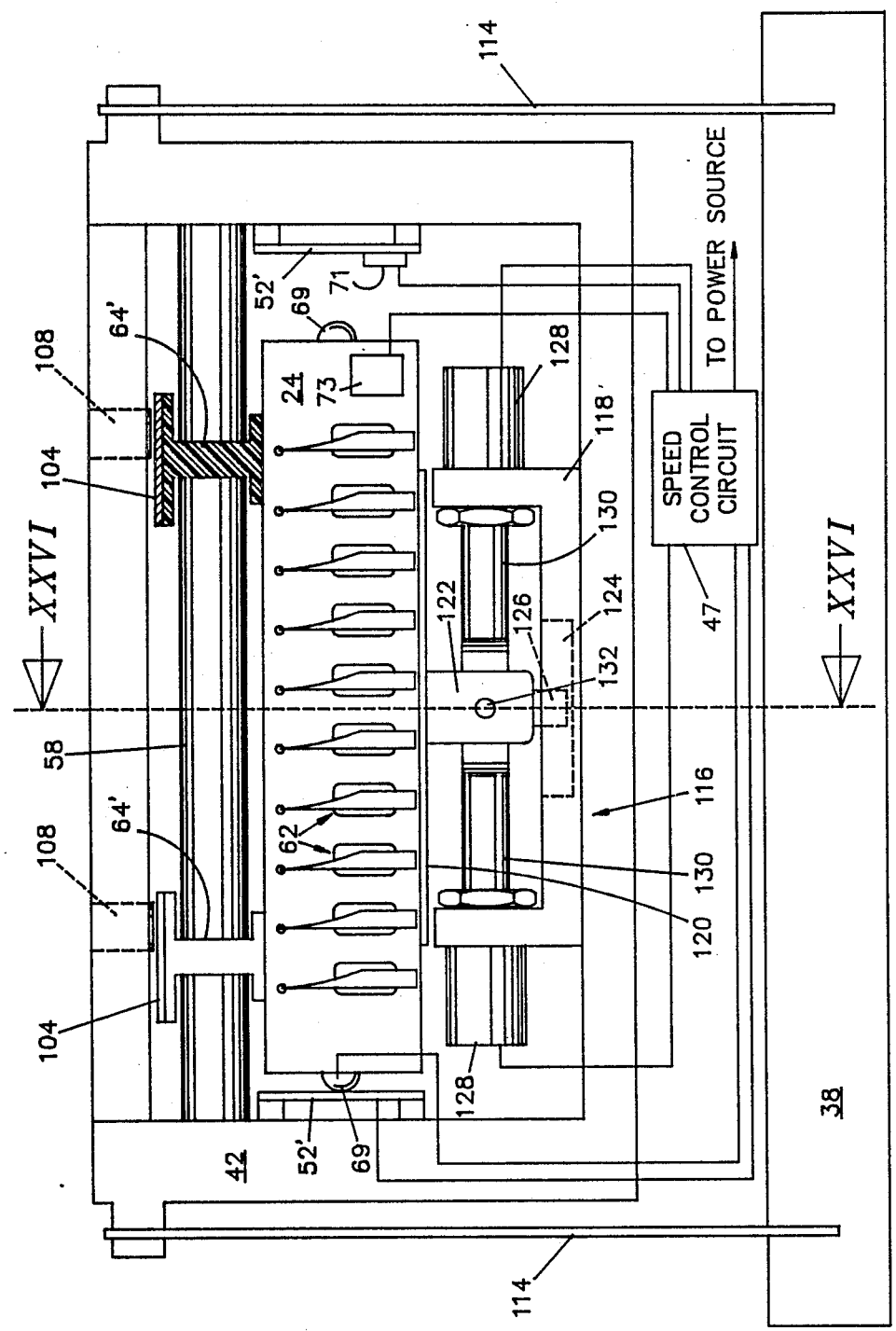
FIG. 25 is a partially cutaway, simplified, front view of a printer according to the present invention in a second preferred embodiment thereof.

In the embodiment of FIGS. 25 and 26, there is a substantial change from the implementation of the present invention as hereinbefore described. Note, however, that the basic manner of operation is still present. The first major deviation is that the ballistic energy transfer device 42 is no longer mounted for sliding motion on the shafts 58. Rather, it is supported at its top (i.e. it hangs) between the tops of a pair of spaced, vertical leaf springs 114 extending upward from and carried by the printer base 38. As will be recalled, it was mentioned earlier that the printer base 38 could be used as the ballistic energy transfer device 42 if desired. As those skilled in the art will readily appreciate, it is this embodiment that could be so configured in various ways. A large, heavy printer base 38 mounted for lateral movement on a support base would energy transfer device 42. As in the previous embodiment, the upper legs 64' have a ferrous plate 104 attached thereto and a pair of magnets 108 are carried by the upper portion of the ballistic energy transfer device 42 in close-spaced proximity to respective ones of the adjacent plates 104 to create an attracting and lifting force therein which tends to frictionlessly support a portion of the weight of the shuttle 24 and thereby reduce the friction associated with its sliding movement along the shaft 58. Note that in this embodiment, as in the previous embodiment, the rebound springs 52' are flexure springs supported at both ends so as to provide a stiff, quick acting, flicking action in rebounding the shuttle 24 for minimization of the turnaround time.

In this embodiment, the linear motor 44 has been replaced by a solenoid drive system generally indicated as 116. As those skilled in the art will appreciate, the solenoid drive system 116 is a form of linear drive and, therefore, the linear motor 44 as described with respect to the previous embodiments could be employed with this embodiment. Likewise, the solenoid drive system 116 of this embodiment could be substituted for the linear motor 44 in any of the previously described embodiments. As shown in the drawings, the solenoid drive system 116 includes a U-shaped mounting plate 118 attached to the bottom of the ballistic energy transfer device 42 under the shuttle 24. The shuttle 24, in turn, has a mounting plate 120 attached to the bottom thereof with a vertical member 122 extending downward therefrom between the two vertical ends of the mounting plate 118. The bottom of the mounting plate 118 has a longitudinal slot 124 therein into which a guide finger 126 extending from the bottom of the member 122 fits for sliding motion. If desired, the guide finger 126 can have a roller bearing fitted thereon for virtually frictionless movement in the slot 124. The finger 126 in the slot 124 replaces the bottom shaft 58 of the prior embodiments in keeping the shuttle moving back and forth in a constant plane and not tending to rotate about the single shaft 58 from which it is hung. A pair of solenoid coils 128 are mounted to respective ones of the two vertical ends of the mounting plate 18. An armature core 130 extends from each of the coils 128 to the vertical member 122 where it is attached by a pin 132. As those skilled in the art will readily recognize and appreciate, the solenoid drive system 116 can be of the stored energy type or the moving coil (i.e. voice coil) type, as best fits the particular application. As with the linear motor 44, the solenoid drive system 116 is operably connected to the speed control circuit 47 to be controlled thereby. It should also be noted with respect to the choice of drives (i.e. a D.C. stepper motor or a D.C. linear motor such as a solenoid or the like) that when a stepper motor is employed, a second encoding device such as that described above (e.g. encoder fence 78 and sensor 36') mounted between the ballistic energy transfer device 42 and the shuttle 24 is preferred so as to obtain the position of the shuttle 24 within the ballistic energy transfer device 42 for optimum driving thereof. With a D.C. linear motor (linear actuator, solenoid, or the like), the second encoding device is not necessary since the device does not move step by step, but rather, once activated moves towards the extent of its movement as long as power is applied.

As those skilled in the art will readily recognize and appreciate, a variation of the foregoing approach would be to employ the entire printer including cover, electronics, etc. (with the exception of the shuttle 24 itself) as the ballistic energy transfer device 42. A large, heavy printer could be mounted for the necessary lateral movement on compliant rubber feet that would allow the printer to move slowly a slight distance from side to side during operation thereof. In such an embodiment, the shuttle 24 could again hang from a pair of thin-webbed legs 64' slidably mounted on a single shaft 58 carried by the printer.

Another aspect of the present invention is also shown with respect to FIG. 25; however, the various techniques now to be described may be adopted for any of the embodiments herein. As can be appreciated, the speed control circuit 47 requires positional input information with respect to the shuttle 24 in order to effect proper control of the reversal drive forces applied thereto. This can be accomplished with an optical fence and sensor arrangement as previously described herein. Additionally, however, the rebound springs 52 in their various embodiments can also be employed for this purpose. For example, by suspending the shuttle 24 from a pair of insulating legs 64' slidably mounted on the shaft 58, the rebound springs 52' and impact pads 69 can be employed as the two contacts of a switch providing the signal of interest. In such case, the legs 64' could be molded of glass-filled Nylon, or the like, with carbon bearings sliding on the shaft 58. Another possibility would be to mount a strain gauge 71 on the rebound spring 52' to provide the signal of interest at an output thereof as a function of the flexing of the spring 52'. Also, an accelerometer 73 could be mounted directly to the shuttle 24 to provide the signal of interest at an output thereof as a function of the acceleration and deceleration of the shuttle 24.

Figure 27:
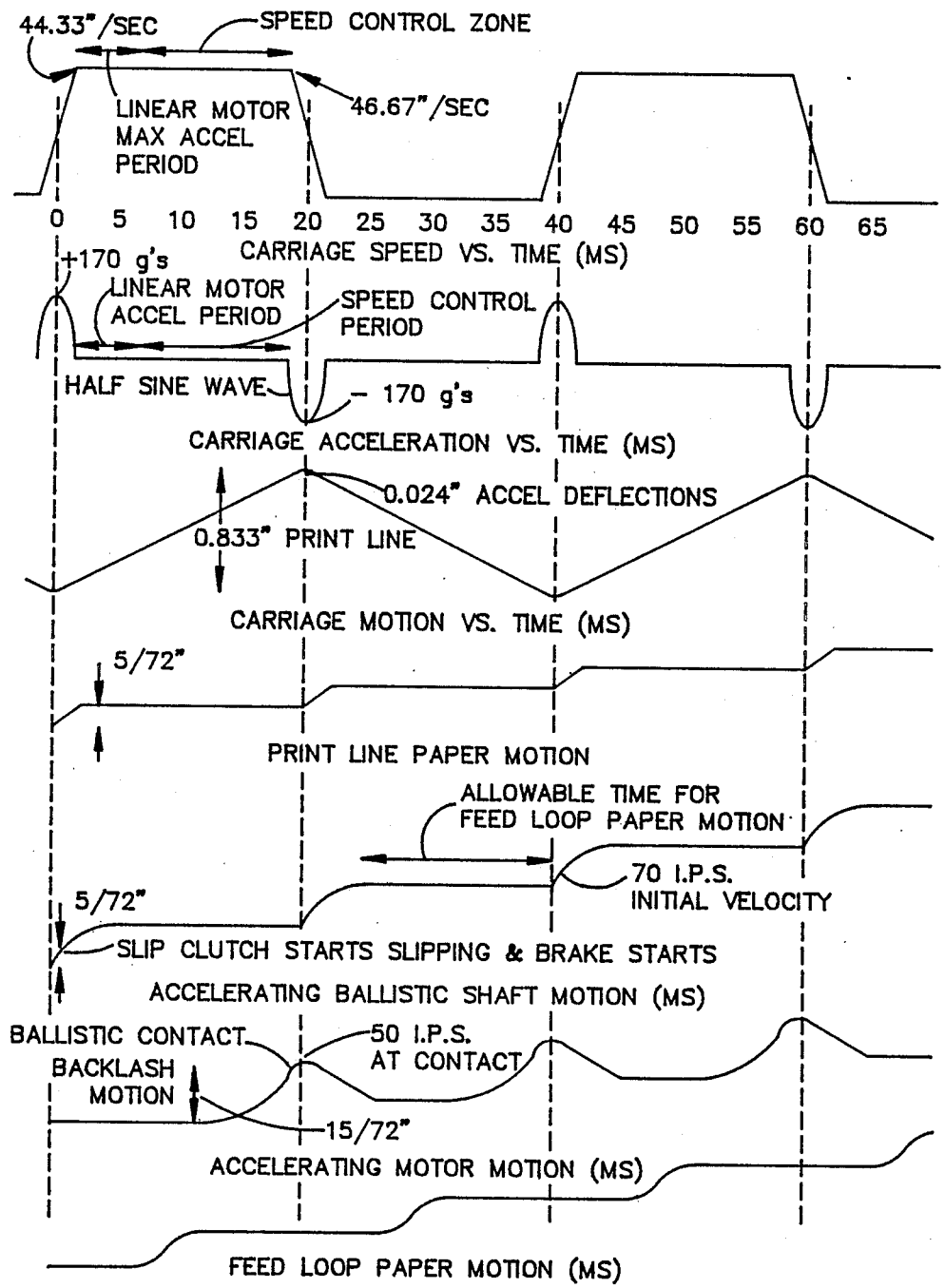
FIG. 27 is a motion and timing diagram of the operation of the present invention.

Having now discussed the construction and operation of a shuttle printer according to the present invention in general according to several embodiments thereof, some of the criteria to be considered in actually constructing a printer according to the teachings herein will now be addressed with particularity. In this regard, reference should also be made to the timing and motion chart provided as FIG. 27 herein.

As described hereinbefore, the shuttle printer of the present invention employs uniformly spaced pins across a print line moving at a constant speed while printing with a very fast turn around time. It is anticipated that turn around times in the order of 1 to 2 MS can be achieved. This is accomplished by a novel design that employs a linear shuttle motor and a kinetic energy transfer system. The design has the advantage of transmitting no inertial forces to the case or platen. The design also allows the turn around time to be varied. This feature can be employed, for example, to provide time to feed between lines of text without another pass of the printheads. In other word, if the shuttle carrying the printheads is turned around and begins its return trip before the paper can be fed to its next print position, the trip is a lost one and the printer will operate in a unidirectional mode. If the turn around time is adjusted so that the paper is in position for printing before the shuttle begins its return trip, the faster approach of bidirectional printing can be applied.

Another tradeoff that can be employed to good advantage in a shuttle printer according to the present invention is that of shuttle speed v. number of pins per printhead position. That is, while the prior art employs single pin printheads at each print position across the shuttle to keep the mass that must be accelerated and reversed to a minimum, the present invention allows one to select the best combination for optimum printer throughput. In this regard, initial investigation indicates that such optimum throughput is probably attained using printheads with multiple print pins vertically disposed above one another. For reference purposes, the single line of print pins spaced along the shuttle as depicted in the drawing figures described earlier herein is referred to as an "unfocused" approach while the use of multiple vertical print pins at each position, as represented by the shuttle 24' of FIG. 22, is referred to as the "focused" approach. Some representative findings are shown in the following tables.

TABLE 1

| 2800 Hz Printhead Performance | | | | |
|---|---|---|---|---|
| | 24 Pins | 33 Pins | 48 Pins | 66 Pins |
| 10 CPI (48 DPI) 1 pm | 800 1 pm | 1052 1 pm | 1345 1 pm | 1800 1 pm |
| Shuttle Frequency | 48 Hz | 64 Hz | 86 Hz | 113 Hz |
| Printing Efficiency | 90.5% | 87.3% | 82.7% | 77.4% |
| 10 CPI (60 DPI) 1 pm | 656 1 pm | 870 1 pm | 1176 1 pm | 1538 |
| Shuttle Frequency | 39 Hz | 52 Hz | 71 Hz | 95 Hz |
| Printing Efficiency | 92% | 87.3% | 82.7% | 77.4% |
| Shuttle Motion | .55" | .4" | .28" | .2" |
| Print Line | 13.2" | 13.2" | 13.44" | 13.2" |

Where: Printing Efficiency = $\frac{\text{Print Time per line}}{\text{Print Time + Turnaround Time}} \times 100$

TABLE 2

| Linear Shuttle Throughput (Non Focused) | | | | |
|---|---|---|---|---|
| | 28 Pins | 28 Pins | 49 Pins | 49 Pins |
| 10 CPI (48 DPI) 1pm | 888 1pm | 804 1pm | 1415 1pm | 1214 |
| Shuttle Frequency | 52 Hz | 47 Hz | 87 Hz | 89 Hz |
| Printing Efficiency | 86.5% | 70.4% | 78.3% | 61.1% |
| 10 CPI (60 DPI) 1pm | 732 1pm | 674 1pm | 1188 1pm | 1043 |
| Shuttle Frequency | 43 Hz | 39 Hz | 69 Hz | 71 Hz |
| Printing Efficiency | 88.9% | 73.3% | 81.8% | 65.0% |
| Shuttle Motion | .48" | .48" | .27" | .27" |
| Print Line | 13.44" | 13.44" | 13.23" | 13.23" |

TABLE 2-continued

| Linear Shuttle Throughput (Non Focused) | | | | |
| --- | --- | --- | --- | --- |
| | 28 Pins | 28 Pins | 49 Pins | 49 Pins |
| LF/TurnAround | 1 MS | 2 MS | 1 MS | 2 MS |

TABLE 3

| Linear Hybrid Shuttle Throughput (Focused) | | | | |
| --- | --- | --- | --- | --- |
| Pins | 2 × 7 Pins | 3 × 7 Pins | 4 × 7 Pins | 7 × 7 |
| 10 CPI (48 DPI) lpm | 497 lpm | 723 lpm | 935 lpm | 1495 |
| Shuttle Frequency | 4 Hz | 6 Hz | 8 Hz | 12 Hz |
| Printing Efficiency | 94.2% | 91.5% | 89.1% | 82.3% |
| 10 CPI (60 DPI) lpm | 402 lpm | 588 lpm | 765 lpm | 1239 |
| Shuttle Frequency | 3 Hz | 5 Hz | 6 Hz | 10 Hz |
| Printing Efficiency | 95.3% | 93.0% | 91.0% | 85.3% |
| Shuttle Motion | 6.6" | 4.4" | 3.3" | 1.9" |
| Print Line | 13.2" | 13.2" | 13.2" | 13.3" |
| LF/TurnAround | 7 MS | 7 MS | 7 MS | 7 MS |

Where "2×7 pins" two 7-pin heads on the shuttle.

As those skilled in the art will appreciate, this invention is an improvement over the printer of Meloni as disclosed in U.S. Pat. No. 4,534,287 in that the Meloni apparatus employs a mechanical drive incorporating a motor-driven wobble plate or disk (designated as track 74) to oscillate a multi-pin print head to effect shuttle printer operation in much the same manner as the prior art apparatus shown in FIG. 10.

Thus, it can be seen from the foregoing that the present invention has truly met its stated objectives by providing a shuttle printer that can provide high quality output while printing at a much higher speeds than prior art dot matrix printers.

Wherefore having thus described the present invention, what is claimed is:

1. In a dot matrix printer of the shuttle variety wherein a plurality of printheads are disposed across the width of a shuttle which in operation is reciprocated substantially, ballistically, linearly at a substantially constant velocity, from side to side within a printer base, the improvement comprising:
   (a) the shuttle being operated in conjunction with a ballistic energy transfer device mounted for reciprocal substantially, ballistic, linear substantially constant velocity, movement from side to side in the opposite direction to the instantaneous movement of the shuttle; and,
   (b) first means, connected between said ballistic energy transfer device and the shuttle, operable only at the extremes of the side to side movements for exerting a rebounding force against the shuttle and said ballistic energy transfer device to aid them in reversing direction wherein forces resulting from the reversal of the shuttle and ballistic energy transfer device are substantially coincident in time, equal and opposite thereby avoiding the need for counterbalancing means to counterbalance the reciprocatory motion of the shuttle.

2. The improvement to a shuttle printer of claim 1 wherein:
said ballistic energy transfer device is of a mass which is at least several times the mass of the shuttle.

3. The improvement to a shuttle printer of claim 1 and additionally comprising:
   (a) a pair of spaced, parallel support rods carried by the printer base;
   (b) means for slidably mounting the shuttle to said support rods; and,
   (c) means for slidably mounting said ballistic energy transfer device to said support rods.

4. The improvement to a shuttle printer of claim 1 and additionally comprising:
a linear motor operably connected between the shuttle and said ballistic energy transfer device for reciprocating the shuttle back and forth with a substantially constant velocity.

5. The improvement to a shuttle printer of claim 4 wherein said linear motor comprises:
   (a) a linear armature carried by the shuttle; and,
   (b) a linear coil assembly carried by said ballistic energy transfer device.

6. The improvement to a shuttle printer of claim 1 wherein said first means comprises:
   (a) a first spring carried by the shuttle; and,
   (b) a pair of spaced first stop blocks carried by said ballistic energy transfer device at the ends of a span of movement of the shuttle to be contacted by said first spring and deform said first spring.

7. The improvement to a shuttle printer of claim 6 wherein:
   (a) said pair of spaced first stop blocks each includes at least one removable first stop for changing the end point of said span of movement; and additionally comprising,
   (b) means for removing and replacing said removable first stop.

8. The improvement to a shuttle printer of claim 7 wherein:
said means for removing and replacing said removable first stop comprises solenoid means operably connected to said first stop.

9. The improvement to a shuttle printer of claim 1 wherein said first means comprises:
   (a) a pair of spaced second springs carried by said ballistic energy transfer device at respective ends of a span of movement of the shuttle; and,
   (b) a pair of spaced second stop blocks carried by the shuttle to contact respective ones of said second springs and deform said second springs.

10. The improvement to a shuttle printer of claim 9 wherein:
   (a) said pair of spaced second stop blocks each includes at least one removable second stop for changing the end point of said span of movement; and additionally comprising,
   (b) means for removing and replacing said removable second stop.

11. The improvement to a shuttle printer of claim 10 wherein:
said means for removing and replacing said removable second stop comprises a solenoid means operably connected to said second stop.

12.
In a dot matrix printer of the shuttle variety wherein a plurality of printheads are disposed across the width of a shuttle which is reciprocated from side to side at a substantially constant velocity within a printer base, the improvement comprising:
   (a) the shuttle being operated in conjunction with a ballistic energy transfer device mounted for reciprocal linear substantially constant velocity movement from side to side in the opposite direction to the instantaneous movement of the shuttle;

(b) first means operably connected between said ballistic energy transfer device and the shuttle for exerting a rebounding force against the shuttle to aid it in reversing direction;

(c) second means operably connected for exerting a centering force against said ballistic energy transfer device;

(d) a pair of spaced second springs carried by said ballistic energy transfer device at respective ends of a span of movement of the shuttle, said second springs each being a leaf spring having a variable spring constant along the length thereof;

(e) a pair of spaced second stop blocks carried by the shuttle to contact respective ones of said second springs and deflect said second springs; and, (f) adjustment means for causing said second stop blocks to contact respect ones of said second springs at selected points along the length thereof whereby the effect spring constant of said first means can be adjusted.

13. The improvement to a shuttle printer of claim 12 wherein said adjustment means comprises:

(a) said pair of spaced second stop blocks each including at least one removable second stop for changing the end point of said span of movement; and additionally comprising, (b) means for removing and replacing respective ones of said removable second stops.

14. The improvement to a shuttle printer of claim 13 wherein:

said means for removing and replacing said removable second stops comprises solenoid means operably connected to said second stops.

15. The improvement to a shuttle printer of claim 12 wherein said adjustment means comprises:

(a) a pair of adjustable force transfer members movable along the length of respective ones of said second springs;

(b) means for transferring force from said second stop blocks to respective ones of said force transfer members; and, (c) means for moving said force transfer members to selected points along the length of respective ones of said second springs.

16. The improvement to a shuttle printer of claim 15 wherein:

said means for moving said force transfer members to selected points along the length of respective ones of said second springs comprises solenoid means operably connected to said force transfer members.

17. The improvement to a shuttle printer of claim 16 wherein:

(a) said adjustable force transfer members each comprises a ball attached to the end of a flexible vane carried by means operably attached to said solenoid means; and, (b) said means for transferring force from said second stop blocks to respective ones of said force transfer members comprises a flexible leaf spring member disposed on the opposite side of said ball from said second spring and parallel thereto.

18. The improvement to a shuttle printer of claim 1 and additionally comprising:

(a) a first linear encoder fence carried by the printer base to be parallel to a path of movement of the shuttle, said first fence having sensible positional indicia thereon; and, (b) first sensor means carried by the shuttle for sensing said positional indicia of said first encoder fence as the shuttle moves back and forth and for producing a signal at an output thereof reflecting the position of the shuttle with respect to the printer base.

19. The improvement to a shuttle printer of claim 18 wherein:

(a) said first encoder fence is of a transparent material; and, (b) said first sensor means includes a light emitting diode disposed on one side of said first fence and a phototransistor disposed on the opposite side of said first fence so as to develop said signal as a function of light passage through said positional indicia said first fence.

20. The improvement to a shuttle printer of claim 4 wherein said linear motor is a stepper motor and additionally comprising:

(a) a second linear encoder fence carried by the shuttle, said second fence having sensible positional indicia thereon; and, (b) second sensor means carried by said ballistic energy transfer device for sensing said positional indicia of said second encoder fence as the shuttle moves back and forth and for producing a signal at an output thereof reflecting the position of the shuttle with respect to said ballistic energy transfer device whereby said linear motor is more easily controlled.

21. The improvement to a shuttle printer of claim 20 wherein:

(a) said second encoder fence is of a transparent material; and, (b) said second sensor means includes a light emitting diode disposed on one side of said second fence and a phototransistor disposed on the opposite side of said second fence so as to develop said signal as a function of light passage through said positional indicia on said second fence.

22. The improvement to a shuttle printer of claim 4 and additionally comprising:

speed control circuit means operably connected to said linear motor for adjustably controlling the magnitude of the constant velocity of the shuttle.

23. The improvement to a shuttle printer of claim 22 wherein:

said speed control circuit means includes means for adjusting the magnitude of the constant velocity of the shuttle from between 5 inches per second and 100 inches per second.

24. The improvement to a shuttle printer of claim 1 wherein said first means comprises:

(a) a pair of impact pads carried by respective ends of the shuttle; and, (b) a pair of springs carried by said ballistic energy transfer device at the ends of a span of movement of the shuttle to be contacted by respective ones of said impact pads whereby said second springs are deformed and then rebound to urge the shuttle in the opposite direction.

25. The improvement to a shuttle printer of claim 24 wherein:

said impact pads are disposed on a line running through the center of gravity of the shuttle whereby sideward, friction producing forces against the shuttle by said second springs are minimized.

26. The improvement to a shuttle printer of claim 24 wherein:
 (a) said second springs are leaf springs supported by said ballistic energy transfer device at ends thereof; and,
 (b) said second springs are positioned transverse the path of travel of the shuttle to be impacted and deflected at a center thereof by said impact pads.

27. The improvement to a shuttle printer of claim 24 wherein:
 said second springs have a spring constant chosen to turnaround the movement of the shuttle in less than 3 milli seconds.

28. The improvement to a shuttle printer of claim 1 and additionally comprising:
 (a) first balancing means of said ballistic energy transfer device for eliminating forces therefrom sideward to the path of movement thereof; and,
 (c) second balancing means of the shuttle for eliminating forces therefrom sideward to the path of movement thereof.

29. The improvement to a shuttle printer of claim 1 and additionally comprising:
 first support means for frictionlessly supporting a portion of the weight of the shuttle to reduce the frictional drag thereon during movement thereof.

30. The improvement to a shuttle printer of claim 29 wherein said first support means comprises:
 (a) a magnetically attactable plate attached to a top surface of the shuttle; and,
 (b) a magnet supported above the shuttle close adjacent said plate to attract said plate and thereby support a portion of the weight of the shuttle.

31. The improvement to a shuttle printer of claim 1 and additionally comprising:
 second support means for frictionlessly supporting a portion of the weight of said ballistic energy transfer device to reduce the frictional drag thereon during movement thereof.

32. The improvement to a shuttle printer of claim 31 wherein said second support means comprises:
 a coil spring disposed vertically between a bottom of the printer base and said ballistic energy transfer device.

33. The improvement to a shuttle printer of claim 4 wherein said linear motor comprises:
 (a) a vertical member carried by the shuttle; and,
 (b) a solenoid assembly carried by said ballistic energy transfer device and having a moving member operably connected to said vertical member.

34. The improvement to a shuttle printer of claim 1 wherein:
 said ballistic energy transfer device is at least a part of the printer base.

35. The improvement to a shuttle printer of claim 1 and additionally comprising:
 (a) means for supporting said ballistic energy transfer device for said reciprocatory movement; and,
 (d) second means operable connected for exerting a centering force against said ballistic energy transfer device.

36. The improvement to a shuttle printer of claim 35 wherein:
 said means for supporting and said second means comprise a pair of leaf springs disposed vertically between a portion of the printer base and said ballistic energy transfer device.

37. The improvement to a shuttle printer of claim 35 and additionally comprising:
 a linear motor operably connected between the shuttle and said ballistic energy transfer device for driving the shuttle back and forth with said reciprocal substantially constant velocity motion with respect to said ballistic energy transfer device.

38. The improvement to a shuttle printer of claim 37 wherein said linear motor comprises:
 (a) a vertical member carried by the shuttle; and,
 (b) a solenoid assembly carried by said ballistic energy transfer device and having a moving member operably connected to said vertical member.

39. The improvement to a shuttle printer of claim 38 and additionally comprising:
 (a) a guide finger extending downward from said vertical member; and,
 (b) a longitudinal guide slot in said solenoid assembly into which said guide finger is slidably disposed.

40. The improvement to a shuttle printer of claim 4 and additionally comprising:
 an accelerometer carried by the shuttle and producing a signal at an output thereof connected to said linear motor whereby said linear motor can be controlled to apply reversing forces to the shuttle at the proper time.

41. The improvement to a shuttle printer of claim 4 wherein said first means comprises a pair of impact pads carried by respective ends of the shuttle and a pair of second springs carried by said ballistic energy transfer device at the ends of a span of movement of the shuttle to be contacted by respective ones of said impact pads whereby said second springs are deformed and then rebound to urge the shuttle in the opposite direction, and additionally comprising:
 a pair of strain gauges operably attached to respective ones of said second springs and producing a signal at outputs thereof connected to said linear motor whereby said linear motor can be controlled to apply reversing forces to the shuttle at the proper time.

42. The improvement to a shuttle printer of claim 24 wherein the shuttle is electrically insulated from said ballistic energy transfer device and additionally comprising:
 (a) a linear motor operably connected between the shuttle and said ballistic energy transfer device for driving the shuttle back and forth in reciprocal motion with respect to said ballistic energy transfer device;
 (b) one of said pair of impact pads and one of said pair of second springs being wired as a first switch connected to be sensed by said linear motor; and,
 (c) the other of said pair of impact pads and the other of said pair of second springs being wired as a second switch connected to be sensed by said linear motor whereby said linear motor can be controlled to apply reversing forces to the shuttle at the proper time.

43. The improvement to a shuttle printer of claim 24 wherein:
 (a) the entire dot matrix printer with the exception of the shuttle comprises said ballistic energy transfer device; and,
 (b) said dot matrix printer is mounted on feet that permit reciprocal movement thereof.

44. The improvement to a shuttle printer of claim 1 wherein:
said first means comprises means for creating a magnetic repulsion force.

45. The improvement to a shuttle printer of claim 1 wherein:
said second means comprises means for creating a magnetic repulsion force.

46. The improvement to a shuttle printer of claim 28 wherein:
said first and second balancing means comprise weights.

47. The improvement to a shuttle printer of claim 46 wherein:
said weights include means for adjusting said weights.

48. The improvement to a shuttle printer of claim 37 wherein said linear motor comprises:
(a) a linear armature carried by the shuttle; and,
(b) a linear coil assembly carried by said ballistic energy transfer device.

49. In a dot matrix printer of the shuttle variety wherein a plurality of printheads are disposed across the width of a shuttle which is reciprocated from side to side within a printer base, the improved method of operation comprising the steps of:
(a) associating the shuttle with a ballistic energy transfer device mounted for reciprocal movement from side to side in the opposite direction to the instantaneous movement of the shuttle;
(b) connecting a first force-producing means between the ballistic energy transfer device and the shuttle whereby a rebounding force is exerted against the shuttle and the ballistic energy transfer device only at the extremes of their side to side motions to aid them in reversing direction;
(c) connecting a second force-producing means between the ballistic energy transfer device and the printer base whereby a centering force is exerted against the ballistic energy transfer device; and,
(d) connecting a first linear motor between the shuttle and the ballistic energy transfer device and using the first linear motor to drive the shuttle back and forth with a substantially constant velocity reciprocal movement with respect to the ballistic energy transfer device.

50. The method of claim 49 and additionally comprising the step of:
adjusting the span of movement of the shuttle whereby its turnaround time is set to allow sufficient time for paper being printed upon to be moved to a next line before the shuttle returns in an opposite direction.

51. The method of claim 49 and additionally comprising the step of:
adjusting a spring constant of the first force-producing means whereby the turnaround time of the shuttle is set to allow sufficient time for paper being printed upon to be moved to a next line before the shuttle returns in an opposite direction.

52. The method of claim 49 and additionally comprising the step of:
adjusting a spring constant of the first force-producing means whereby the turnaround time of the shuttle is less than 3 milliseconds.

53. The method of claim 49 and additionally comprising the step of:
adjusting the speed of the first linear motor to selectively drive the shuttle back and forth in an reciprocal motion with respect to the ballistic energy transfer device at a constant speed adjustable from 5 inches per second to 100 inches per second.

54. A non-resonant shuttle dot matrix printer mechanism comprising:
a shuttle carrying a plurality of printheads disposed across the width of the shuttle;
support and guide means supporting said shuttle, while permitting substantially ballistic, constant velocity linear side to side motion of said shuttle, and guiding said shuttle to define said linear motion;
a ballistic energy transfer device mounted for substantially ballistic, constant velocity linear side to side motion of the same orientation as the permitted linear motion of the shuttle;
actuator means connected to produce a substantially constant velocity linear side to side motion, over a desired stroke length, of said shuttle, alternately in opposite directions;
energy conversion means disposed to engage said shuttle and said ballistic energy transfer device, only at each end of each stroke, when said shuttle and said ballistic energy transfer device are moving in synchronism in opposite directions, to convert substantially all of the kinetic energy of the moving shuttle and the ballistic energy transfer device into potential energy stored in said energy conversion means and to release that potential energy to accelerate said shuttle and said ballistic energy transfer device in their respective opposite directions.

55. A non-resonant shuttle dot matrix printer mechanism comprising:
a printer base for supporting moving parts of the printer;
a shuttle carrying a plurality of printheads disposed across the width of the shuttle;
support and guide means supporting said shuttle while permitting substantially ballistic, constant velocity linear side to side motion of said shuttle, and guiding said shuttle to define said linear motion;
a ballistic energy transfer device mounted on said base for substantially ballistic, constant velocity linear side to side motion relative to said base of the same orientation as the permitted linear motion of the shuttle;
means for biasing said ballistic energy transfer device to a desired rest position
actuator means connected to produce a substantially constant velocity linear side to side motion, over a desired stroke length, of said shuttle, alternately in opposite directions;
energy conversion means disposed to engage said shuttle and said ballistic energy transfer device, only at each end of each stroke, when said shuttle and said ballistic energy transfer device are moving in synchronism in opposite directions, to convert substantially all of the kinetic energy of the moving shuttle and the ballistic energy transfer device into potential energy stored in said energy conversion means and to release that potential energy to accelerate said shuttle and said ballistic energy transfer device in their respective opposite directions.

* * * * *